United States Patent [19]

Shiotani et al.

[11] Patent Number: 5,040,444
[45] Date of Patent: Aug. 20, 1991

[54] SAW BLADE POSITION SETTING APPARATUS

[75] Inventors: Takeshi Shiotani; Kouichi Miyamoto, both of Chiyoda, Japan

[73] Assignee: Ryobi Limited, Hiroshima, Japan

[21] Appl. No.: 572,470

[22] Filed: Aug. 27, 1990

[30] Foreign Application Priority Data

Aug. 30, 1989 [JP] Japan .................. 1-101645[U]

[51] Int. Cl.$^5$ .............................. B27B 5/24
[52] U.S. Cl. .................... 83/473; 83/477.1; 83/477.2
[58] Field of Search ............... 83/471.3, 471.2, 473, 83/477.1, 477.2, 477, 508.2

[56] References Cited

U.S. PATENT DOCUMENTS

| | | | |
|---|---|---|---|
| 2,844,173 | 7/1958 | Gaskell | 83/477.1 |
| 2,852,047 | 9/1958 | Odlum et al. | 83/477.1 X |
| 3,011,529 | 12/1961 | Copp | 83/477.1 X |
| 3,315,715 | 4/1967 | Mytinger | 83/477.1 |
| 3,538,964 | 11/1970 | Warrick et al. | 83/473 |

Primary Examiner—Frank T. Yost
Assistant Examiner—Kenneth E. Peterson
Attorney, Agent, or Firm—Oliff & Berridge

[57] ABSTRACT

A saw blade position setting apparatus of a working table such as a table saw which is mounted on a support frame and to which a blade assembly is mounted with a handle assembly including a handle and a handle shaft held by the support frame to be rotatable and operatively connected to the blade assembly. The blade assembly is supported by a support member connected to the handle shaft. A clutch mechanism is selectively transmitting rotation of the handle to a blade assembly elevating mechanism and a blade assembly inclining mechanism. The elevational position and the inclination of the blade assembly are adjusted in accordance with the rotation of the handle assembly. A rack is secured to the support frame and the handle assembly is moved along the rack to a predetermined angle position. A lock lever is disposed in operative association with the handle assembly and operatively connected to the clutch mechanism. The lock lever serves to lock the support member to the predetermined angle position and is provided with a cam mechanism through which operation of the clutch mechanism is changed.

8 Claims, 6 Drawing Sheets

SAW BLADE POSITION SETTING APPARATUS

BACKGROUND OF THE INVENTION

This invention relates to an apparatus for setting a position of a blade assembly on a working table for adjusting an inclination and an elevational position of the blade assembly on the working table such as a table saw.

Generally, there is provided a working table such as a table to which a sawing blade is mounted, called merely a table saw hereinafter, for cutting various kinds of materials. The table saw is provided with a working blade such as a rotary blade or a knife, called merely a blade hereinafter, which is adjustable in an amount to be projected on the working table and in an inclination thereof to thereby suitably work a material to be worked.

A conventional saw blade position setting apparatus of the character described above, however includes independent elevational position, i.e. the projecting amount, and a blade inclination adjusting mechanism. Hence, it is necessary to also independently locate two independent handle members for handling the position adjusting mechanism and the inclination adjusting mechanism, resulting in the increasing of parts or elements to be equipped and the increasing of working table setting space.

In order to obviate these defects, conventional technology provides a saw blade position setting apparatus capable of adjusting the elevational position and the inclination angle of the blade by operating one handle member. The apparatus of this kind, however, requires operation changing working by strongly and forcibly holding the handle member with both hands. This operation requires large manual force of operating the mechanisms, and is inconvenient and troublesome.

SUMMARY OF THE INVENTION

An object of the present invention is to substantially eliminate the defects or drawbacks encountered to the prior art described above and to provide a saw blade position setting apparatus of a working table of a round saw capable of effecting the blade elevation adjustment and the blade inclination adjustment by easily operating only one handle member.

This and other objects can be achieved according to the present invention by providing an apparatus for setting a saw blade position of a working table such as a table saw which is mounted on a support frame and to which a saw blade assembly is mounted, the apparatus comprising a handle assembly including a handle and a handle shaft held by the support frame to be rotatable and operatively connected to the blade assembly, a support member connected to the handle shaft for supporting the blade assembly, a blade assembly elevating mechanism for elevating the blade assembly in accordance with the rotation of the handle assembly, a blade assembly inclining mechanism for inclining the blade assembly supported by the support member in accordance with the rotation of the handle assembly and including a rack secured to the support frame and a pinion member engaging with the rack and rotatably supported on the handle shaft, a clutch mechanism selectively transmitting rotation of the handle to the blade assembly elevating mechanism and the blade assembly inclining mechanism, and a lock lever disposed in operative association with the handle assembly and operatively connected to the clutch mechanism, the lock lever serving to lock the support member to a predetermined angle position and being provided with a cam mechanism for cooperating with another cam mechanism operatively connected to the handle shaft, operation of the lever changing over the clutch mechanism through the two cam mechanisms.

According to the structure and the character of the saw blade position setting apparatus described above, the elevational position adjustment of the blade can be made by locking the lock lever and, in this operation, the clutch is changed by the associated operation of the cam members and the rotation of the handle member is transmitted to the blade assembly elevating mechanism. On the other hand, when the blade is inclined, the locking condition of the lock lever is released to change the clutch to release the engagement between the handle shaft of the handle member and the blade assembly elevating mechanism. At this moment, the rotation of the handle shaft is transmitted to the pinion gear connected to the handle shaft and the support member is moved together with the pinion gear along the rack secured to the frame in accordance with the rotation of the handle shaft. When the support member is moved to the predetermined angle position, the lock lever is rotated to thereby lock the handle shaft at this position. Since the handle shaft is brought into connection to the support member for supporting the blade, the support member is inclined, hence, together with the blade, in accordance with the rotation of the handle shaft.

As described above, the elevational position adjustment and the inclination adjustment of the blade mounted to the working table can be achieved easily by selective operation of the one handle member and the lock lever provided with the cams, thus the whole structure of the apparatus being made compact.

BRIEF DESCRIPTION OF THE DRAWINGS

For a better understanding of the present invention and to show how the same may be carried out into effect, reference will now be made, by way of a preferred embodiment, to the accompanying drawings, in which.

DESCRIPTION OF THE PREFERRED EMBODIMENTS

Figure 1:
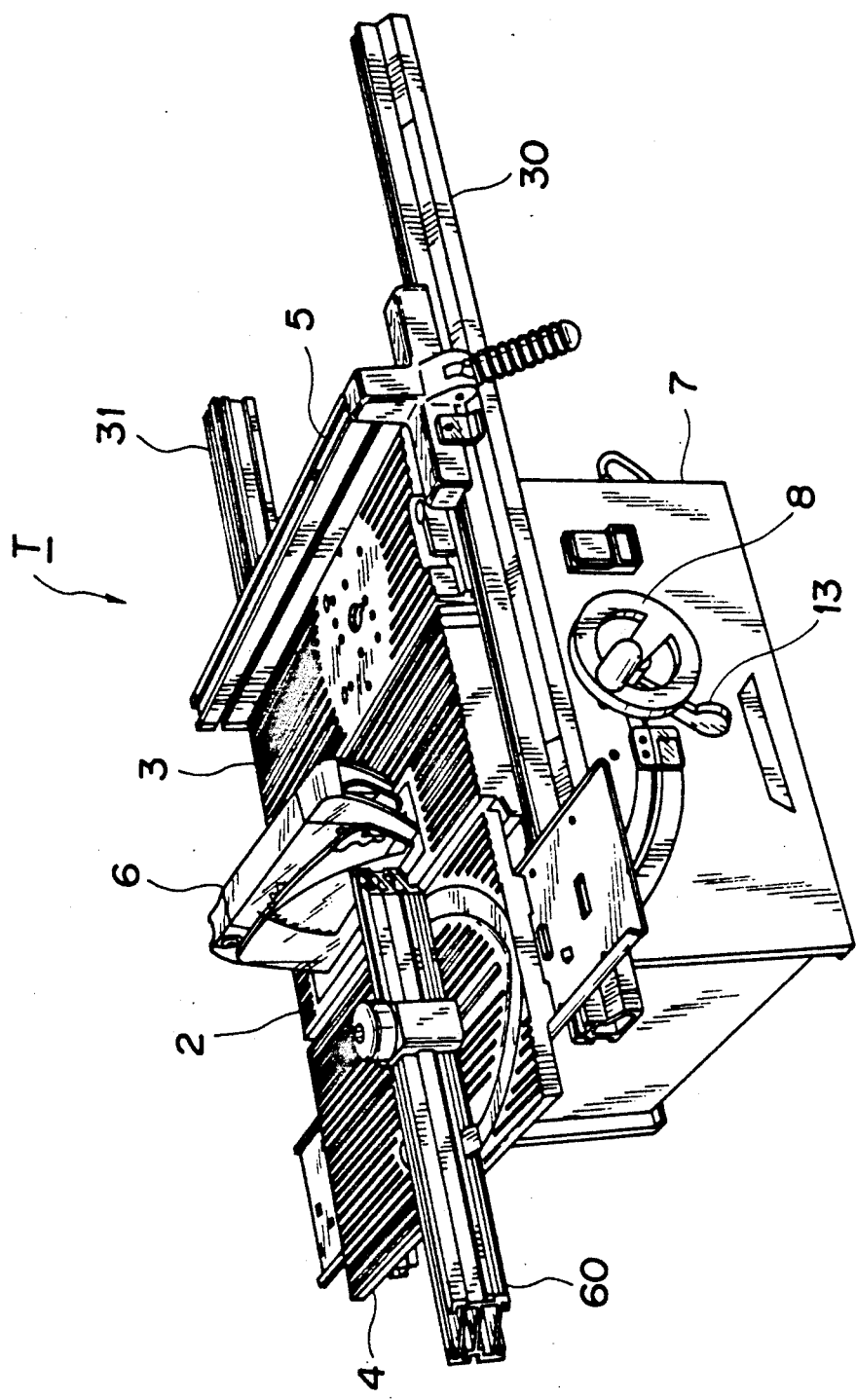
FIG. 1 is a perspective view of a table saw according to the present invention.
Figure 2:
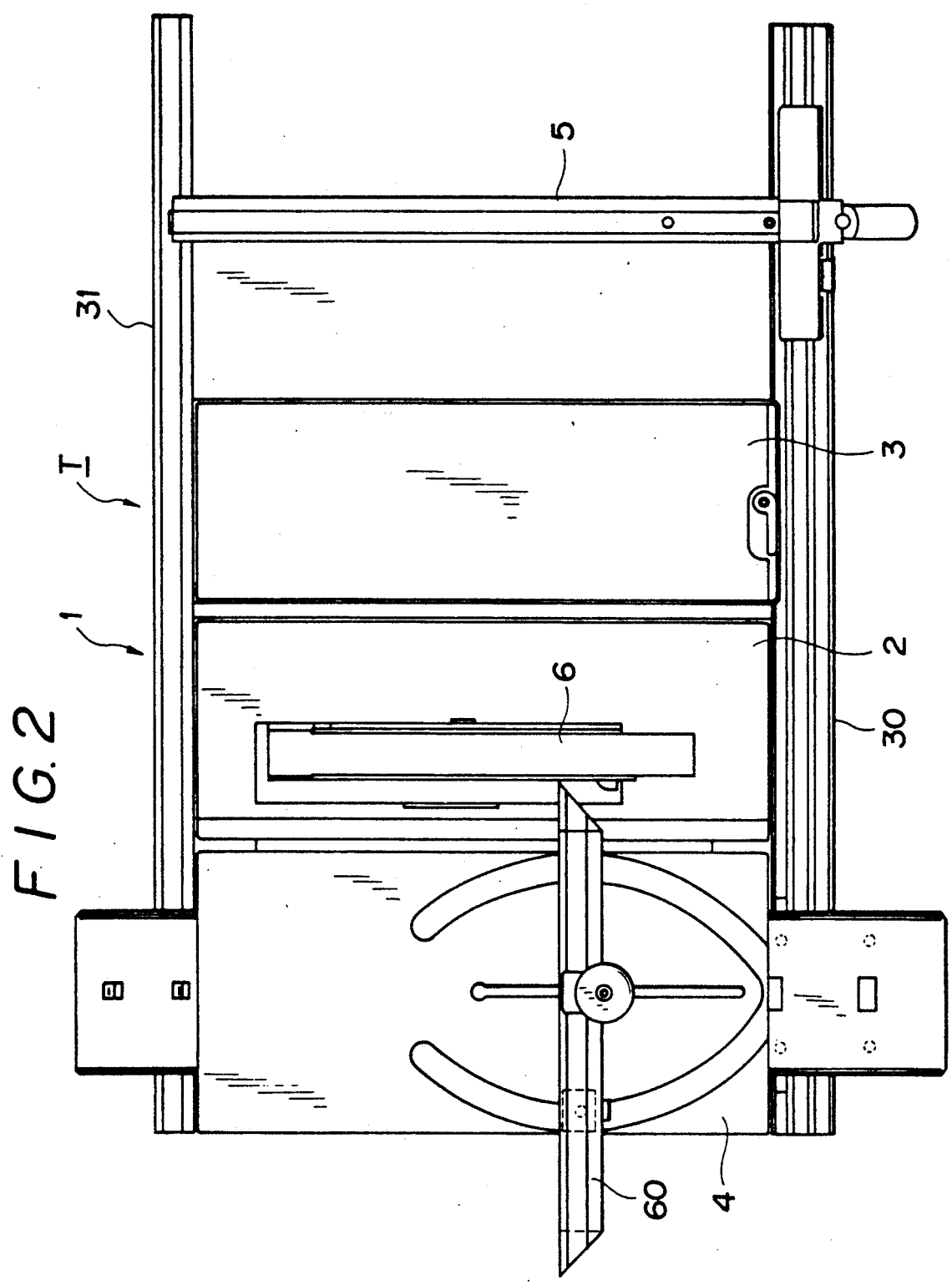
FIG. 2 is a top plan view of the table saw shown in FIG. 1.
Figure 3:
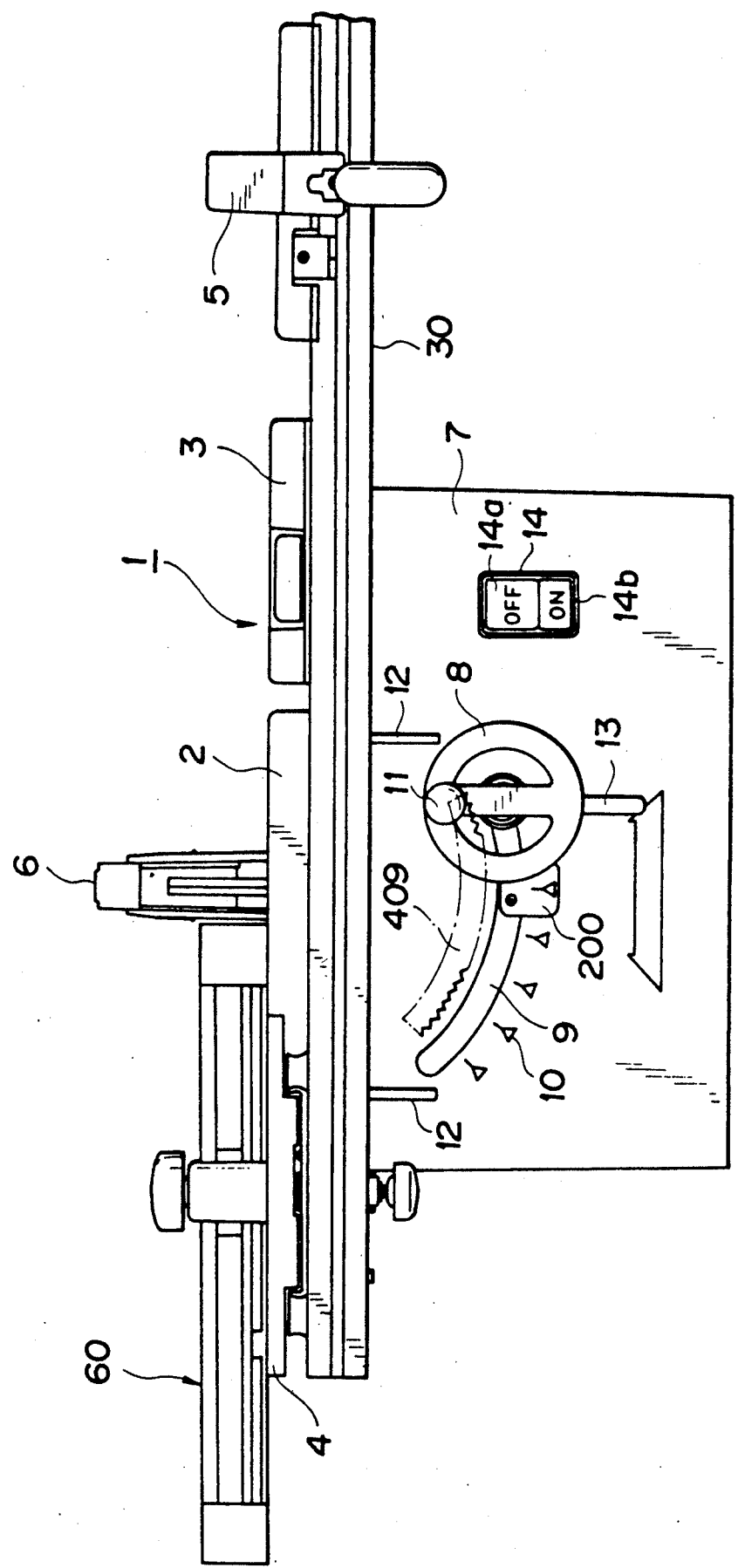
FIG. 3 is a front view of the table saw shown in FIG. 2.

Referring to FIGS. 1 to 4, a table saw T according to the present invention comprises a working table 1 supported on a support frame 7. The working table 1 is equipped with a front guide rail 30 on a side at which an operator is positioned and a rear guide rail 3. A circular saw table 2 is secured at substantially the central portion of the working table 1 between the front and rear guide rails 30 and 31. The circular saw table 2 is provided with a safety cover 6 in which a circular saw is accommodated. An auxiliary table 3 for supporting the material when worked is disposed on a righthand position, as viewed in FIG. 3, of the circular saw table 2 to be bilaterally slidable along the guide rails 30 and 31. On further righthand side of the auxiliary table 3, there is disposed an lip fence 5 for setting cutting dimensions of the material to be out to be bilaterally slidable along the front and rear guide rails 30 and 31. On the lefthand side, as viewed in FIG. 3, is disposed a miter table 4 for guiding the material to a predetermined cutting position of the circular saw S to be bilaterally slidable along the front and rear guide rails 30 and 31 and on the miter table 4 is mounted a miter fence 60.

Figure 4:
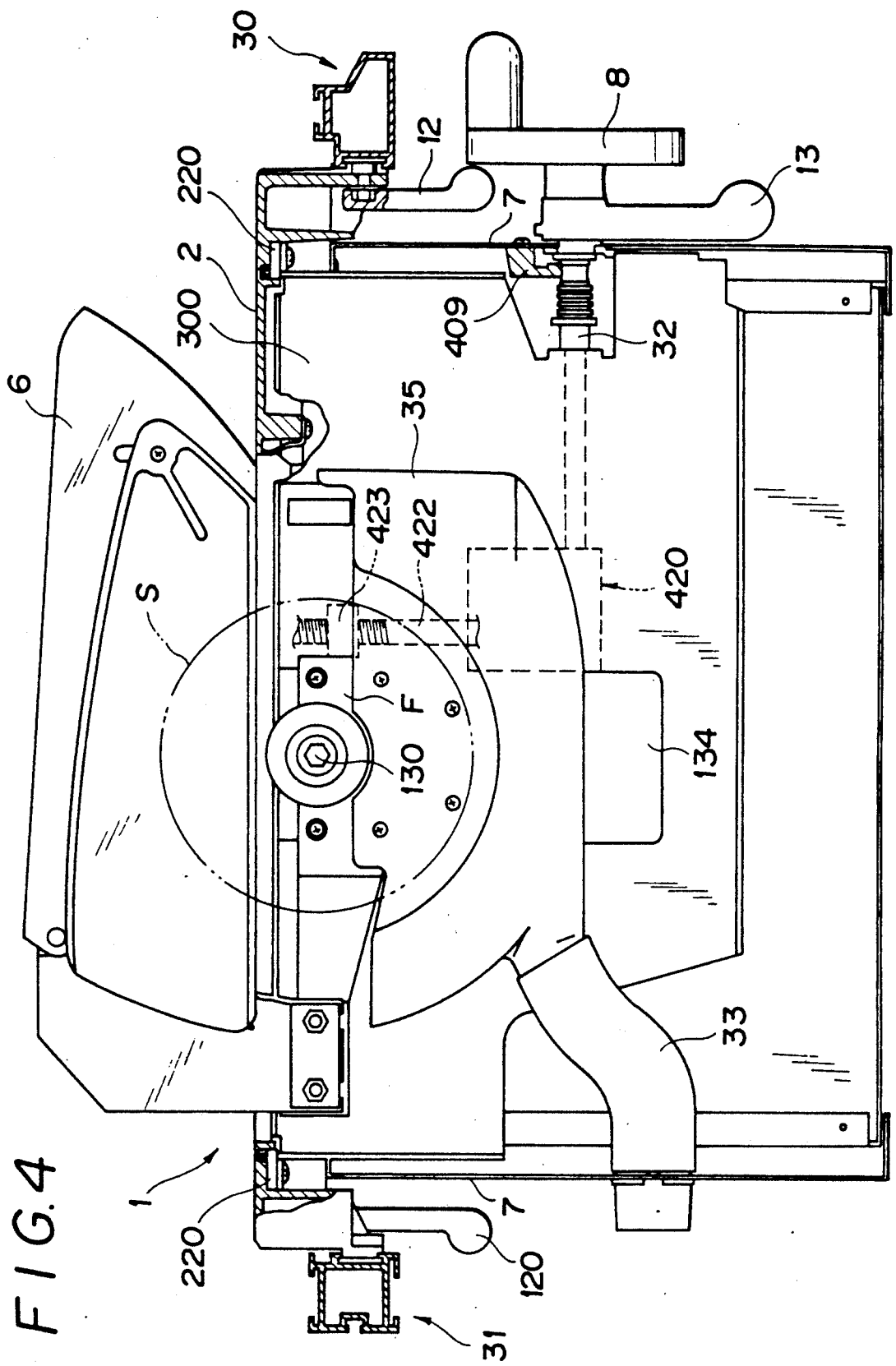
FIG. 4 is a cross sectional view of the table saw shown in FIG. 3.
Figure 5:
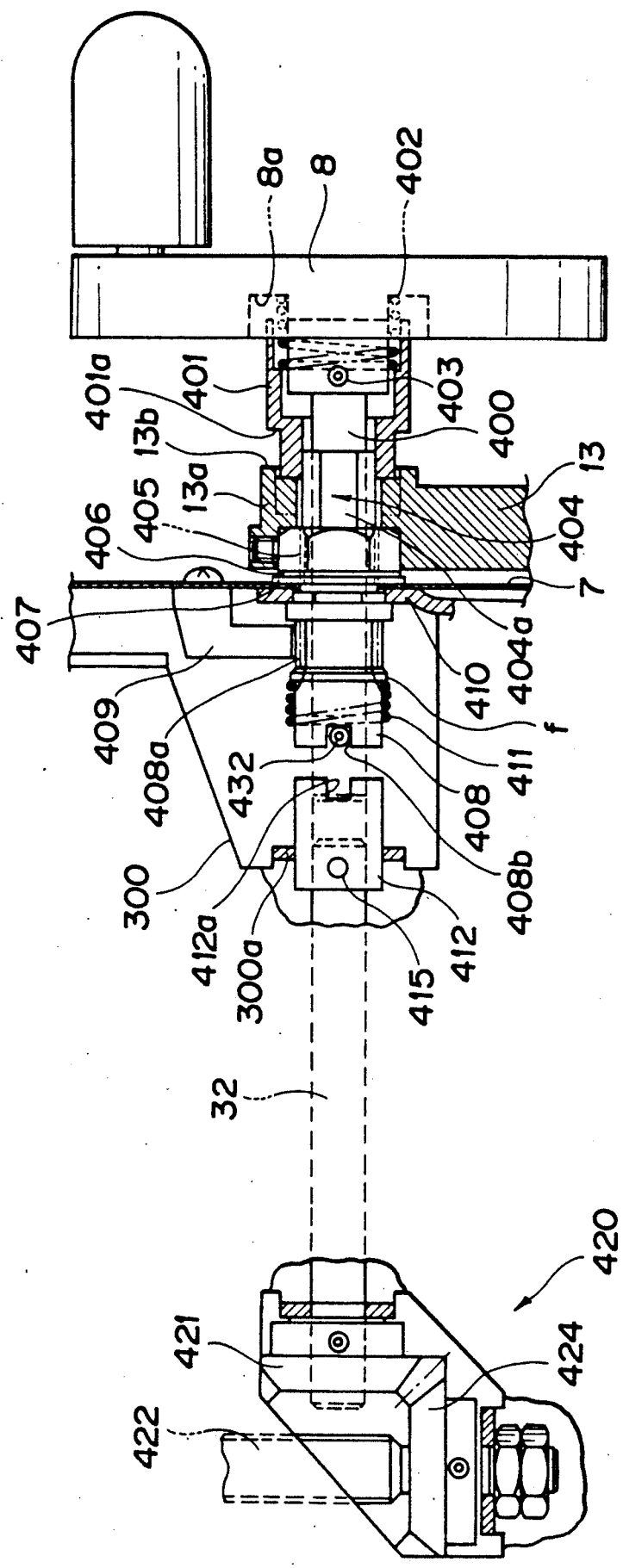
FIG. 5 is a side view, partially in section and broken away, of a saw blade position setting apparatus, in a lock released condition, according to the present invention provided for the table saw shown in FIG. 1.

To the support frame 7 is rotatably attached a round handle 8 having, at its rear portion, a lock lever 13 as shown in FIGS. 3 and 4. The central portion of the round handle 8 is connected to a handle shaft 400 which is rotated in accordance with the rotation of the round handle 8. As shown in FIG. 5, the rotation of the handle shaft 400 is transmitted to an operation shaft 32 when a spring pin 432 fixed to the round handle shaft 400 is engaged with a recess 412a of a clutch cylinder 412 mounted to the base end of the operation shaft 32. The rotation of the operation shaft 32 is further transmitted to another operation shaft 422 through a pair of bevel gears 421 and 424 forming a gear mechanism 420 to thereby move the circular saw S so as to project on the circular saw table 2 or accommodate the same in the support frame 7.

In another aspect, the rotation of the round handle 8 is transmitted to a pinion gear 408 when the spring pin 432 is engaged with a recess 408b of the pinion gear 408. The pinion gear 408 is rotated along a rack 409 secured to the support frame 7. At this time, the round handle 8 is moved along an arcuate slit 9, shown in FIG. 3, formed in the support frame 7, whereby the circular saw S is inlined with a predetermined angle as shown in FIG. 5. Scales 10 are formed along the contour of the arcuate slit 9 for indicating the inclination of the circular saw S. A scale plate 200 is mounted in a projecting manner to a support plate 300 for supporting the circular saw S and the scale plate 200 serves to set the circular saw S with the predetermined inclination angle in accordance with the movement along the slit 9 while indicating the scale 10.

Referring to FIG. 3, a switch unit 14 for switching the operation of an electric motor, not shown, for driving the circular saw S is mounted to the support frame 7 on the righthand side, as viewed, of the round handle 8. The switch unit 14 includes an off-switch 14a and an on-switch 14b, and when the on-switch 14b is depressed, the motor starts the operation to drive the circular saw S and, on the contrary, when the off-switch 14a is depressed, the motor stops the operation to drive the circular saw S.

The front guide rail 30 is secured in a clamped manner by a plurality of guide rail securing handles 12 arranged on the upper portion of the support frame 7 with a space and the rear guide rail 31 is also secured in a clamped manner by a plurality of guide rail securing handles 120 arranged on the upper portion of the support frame 7.

Referring to FIG. 4, the circular saw S is secured to a frame F which is vertically movable on the support plate 300 by the rotation of a shaft 130. The frame F is provided with a screw engaging portion 423 with which is engaged a feed screw 422 which is operatively connected to the operation shaft 32 through the gear mechanism 420. According to the structure described above, the frame F supporting the circular saw S is vertically moved in an vertically formed opening 134 of the support plate 300 along a guide mechanism, not shown, in accordance with the rotation of the circular saw S. The front and rear upper end edges of the support plate 300 are supported to the upper portion of the support frame 7 to be pivotal about horizontal pins 220 and 220, respectively. The handle shaft 400 can be swung through the rotation of the round handle 8 to cause inclination movement of the support plate 300 about the horizontal pin 220, thereby inclining the circular saw S.

A guard member 35 is secured to the support plate 300 for accommodating cut chips of the worked material and the guard member 35 is connected to a hose member 33 through which the chips are externally discharged.

The saw blade position setting apparatus according to the present invention will be described in detail hereinunder.

Figure 7:
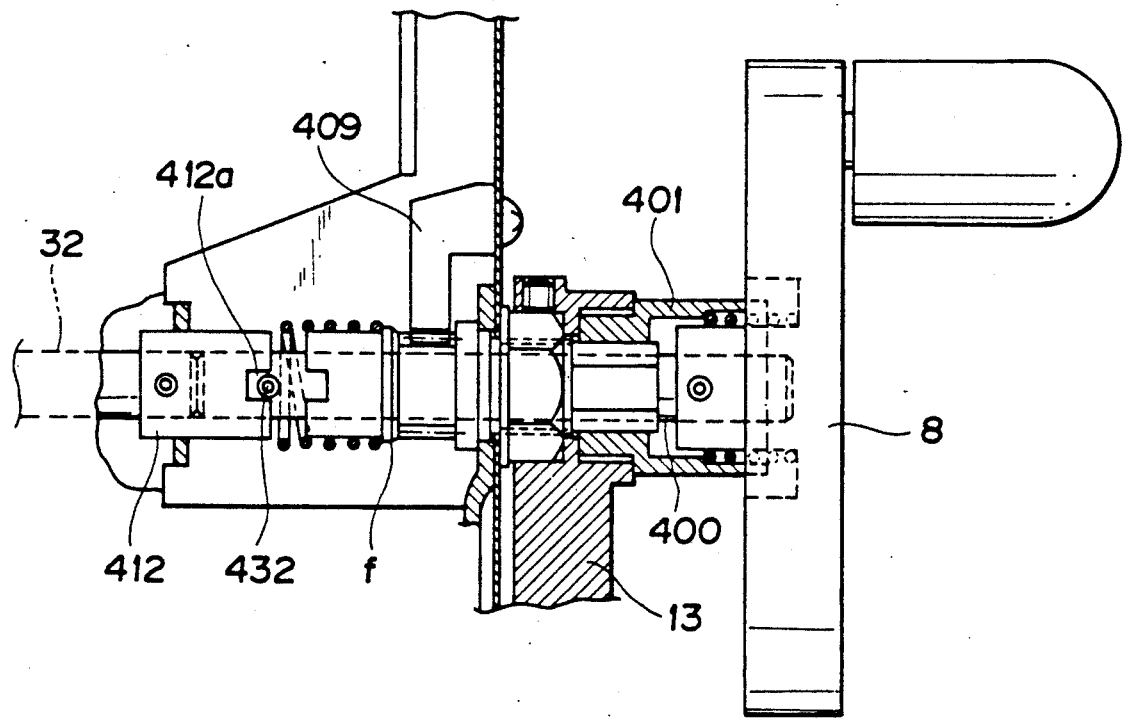
FIG. 7 is a side view, partially in section and broken away, of the saw blade position setting apparatus shown in FIG. 6 in a locked condition.

Referring to FIGS. 5 and 7, the handle shaft 400 is mounted to the round handle 8 and the handle shaft 400 is provided with a large diametered base portion to which is secured a pin 403 engaged with one end of a coil spring 402. The other end of the coil spring 402 abuts against the inner wall of a recess 8a of the round handle 8. The base portion of the handle shaft 400 is covered by a cam cylinder 401, which is urged leftward as viewed by the coil spring 402. The handle shaft 400 is supported rotatably in a stationary supporting cylinder 404 fixedly supported to an attachment plate 410 disposed on the rear side of the support frame 7. The inner end of the handle shaft 400 extends into the clutch cylinder 412 supported by a supporting portion 300a of the support plate 300. The supporting cylinder 404 has an outer end at which is formed a hexagonal portion 404a having an outer periphery with which the front portion of the cam cylinder 401 is engaged to be axially slidable. The supporting cylinder 404 is provided with a screwed portion at a portion near the support frame 7 and a hexagonal nut 405 is engaged with the screwed portion. The head of the lock lever 13 is engaged with the hexagonal nut 405 so that the hexagonal nut 405 is rotated by the rotation of the lock lever 13. The attachment of the support plate 300 to the support frame 7 can be made strong or loosened by clamping or loosening a leaf spring 406 and a flat washer 407 disposed between the support frame 7 and the hexagonal nut 405.

Figure 6:
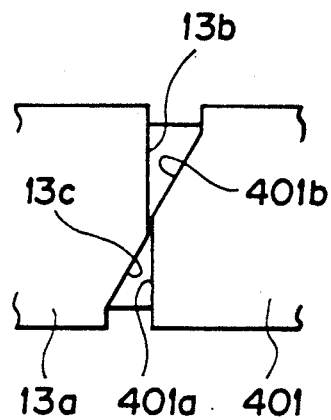
FIG. 6 is an illustration for showing the condition of cam surfaces in the lock released condition.

As shown in FIG. 6, the cam cylinder 401 is provided with a stepped portion acting as a cam surface 401a and a corresponding cam surface 13b is formed to the end portion of the head 13a of the lock lever 13. To both the cam surfaces 401a and 13b are formed inclined portions 401b and 13c which are operatively associated with each other.

When the locking condition of the lock lever 13 is released by rotating the same, the cam cylinder 401 is forcibly pushed outward.

The supporting cylinder 404 is provided with a projecting portion, inside the support frame 7, to which a pinion cylinder 408 is mounted to be rotatable. The pinion cylinder 408 has a gear portion 408a, which is meshed with a gear portion formed to the rack 409 moving along the arcuate slit 9 shown in FIG. 3. The pinion cylinder 408 also has a flanged portion f formed at the central portion of the outer periphery thereof. One end of a coil spring 411 is engaged with the flange f and the other end of the coil spring 411 is engaged with the pinion 432 of the handle shaft 400. A recess 408b is formed to the end surface of the pinion cylinder 408 and a recess 412a is also formed to the end surface of the clutch cylinder 412.

The clutch cylinder 412 is coupled through a pin 415 to the operation shaft 32, which is connected to a feed screw 422 through the gear mechanism 420. The gear mechanism 420 is composed of the first bevel gear 421 secured to the front end of the operation shaft 32 and the second bevel gear 424 meshed with the first bevel gear 421. The second bevel gear 424 is secured to the lower end of the feed screw 422.

Figure 8:
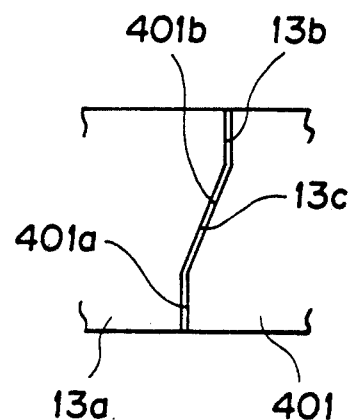
FIG. 8 is an illustration for showing the condition of cam surfaces in the locked condition.

FIGS. 7 and 8 show the condition in which the inclination of the circular saw S is set by locking the lock lever 13 and securing the operation shaft 32 to a predetermined angle position in the slit 9. In this condition, the cam surface 401a of the cam cylinder 401 and the cam surface 13b of the head 13a of the lock lever 13 are in registration with each other as shown in FIG. 8 and the pin 432 of the handle shaft 400 is fitted into the recess 412a of the clutch cylinder 412. Accordingly, when the round handle 8 is rotated under this condition, the rotation of the handle shaft 400 is transmitted to the operation shaft 32 through the clutch cylinder 412 and, hence, the feed screw 422 is rotated through the gear mechanism 420, whereby the circular saw S can be vertically elevated.

When the locking condition of the lock lever 13 is released by rotating the same from the position shown in FIG. 7 by a predetermined angle, the inclining portions 401b and 13c of the cam surfaces 401a and 13b are offset as shown in FIG. 6 and the cam cylinder 401 is pushed forcibly outward as shown in FIG. 5 whereby the handle 8 and the handle shaft 400 are hence forcibly pushed outward by the movement of the cam cylinder 401 through the coil spring 402. As a result, the pin 482 of the handle shaft 400 is disengaged from the recess 412a of the clutch cylinder 412 and fitted into the recess 408b of the pinion cylinder 408b. Accordingly, the pinion cylinder 408 is rotated in accordance with the rotation of the round handle 8, and the round handle 8 and the lock lever 13 are swung integrally along the rack 409. When these members reach a predetermined angle position, the lock lever 13 is locked. Thereafter, the hexagonal nut 405 is rotated to clamp and secure these members by pushing the leaf spring 406 and the flat washer 407 against the support frame 7, whereby the circular saw S is set to the predetermined angle position. Further, when the circular saw S is locked in a inclination condition, the rotation of the handle 8 causes the saw S to project and retract obliquely from the saw table 2.

Accordingly, as described above, the adjustment of the elevational position and the inclination of the circular saw can be achieved only by changing the transmission of the rotation force of the round handle by operating the lock lever so as to be clamped or released. Thus, both the adjustments can be done only by the operation of the rotation of the round handle. In addition, the lock lever is secured to the handle shaft, so that the operation of the lock lever can be easily made.

What is claimed is:

1. An apparatus for setting a saw blade position of a working table which is mounted on a support frame and to which a blade assembly is mounted, comprising:
    a handle means including a handle and a handle shaft held by the support frame to be rotatable and operatively connected to the blade assembly;
    a support member connected to said handle shaft for supporting the blade assembly;
    a blade assembly elevating means for elevating the blade assembly in accordance with the rotation of said handle means;
    a blade assembly inclining means for inclining said blade assembly supported by said support member in accordance with the rotation of said handle means and including a rack secured to said support frame and a pinion gear engaging with said rack and rotatably supported on said handle shaft;
    a clutch means selectively transmitting rotation of said handle to said blade assembly elevating means and said blade assembly inclining means; and
    a lock lever disposed in operative association with said handle means and operatively connected to said clutch means, said lock lever serving to lock said support member to a predetermined angle position and being provided with a cam means for cooperating with another cam means operatively connected to said handle shaft, operation of said lever selectively operating said clutch means through said two cam means to transmit rotation of said handle to either said blade assembly elevating means or said blade assembly inclining means.

2. An apparatus according to claim 1, wherein said handle shaft is operatively connected to an operation shaft supported by said support frame and said clutch means includes a clutch cylinder secured to the operation shaft, said operation shaft being rotated through an engagement between said clutch cylinder and a pin provided on said handle shaft.

3. An apparatus according to claim 2, wherein said pin engages with a part of said pinion gear so as to rotate the same in accordance with the rotation of said handle shaft, said pinion gear engaging with said rack so as to move said handle means along said rack.

4. An apparatus according to claim 1, wherein said another cam means comprises a cam cylinder mounted to a base end of said handle shaft, said cam cylinder being provided with a cam surface which is engaged with the cam means of said lock lever having a cam surface formed on a head portion thereof.

5. An apparatus according to claim 4, wherein clutch changing operation is done by moving said handle shaft in its axial direction through the engagement of said cam surfaces of said cam cylinder and said lock lever.

6. An apparatus according to claim 1, wherein said blade assembly is operatively connected to said operation shaft through a feed screw and a gear mechanism mounted on said operation shaft so that said blade assembly is moved in accordance with the rotation of said handle shaft through said operation shaft.

7. An apparatus according to claim 6, wherein said gear mechanism includes a first bevel gear secured to said operation shaft and a second bevel gear secured to said feed screw in engagement with said first bevel gear.

8. An apparatus according to claim 1, wherein said blade assembly is a circular saw.

* * * * *